United States Patent [19]

Hotaka

[11] Patent Number: 4,660,137

[45] Date of Patent: Apr. 21, 1987

[54] INVERTER SYSTEM

[75] Inventor: Nobuhiro Hotaka, Nagano, Japan

[73] Assignee: Shinaro Electric Co., Ltd., Japan

[21] Appl. No.: 670,609

[22] Filed: Nov. 13, 1984

[51] Int. Cl.4 ............................................. H02H 7/122
[52] U.S. Cl. ........................................ 363/56; 363/41;
363/98; 361/87
[58] Field of Search ................. 363/41, 56, 58, 96–98,
363/132, 136, 137; 361/87, 93, 18

[56] References Cited

U.S. PATENT DOCUMENTS

| | | | |
|---|---|---|---|
| 3,970,916 | 7/1976 | Kienscherf | 363/41 X |
| 4,204,266 | 5/1980 | Kammiller et al. | 363/98 |
| 4,364,109 | 12/1982 | Okado et al. | 363/41 |

Primary Examiner—Peter S. Wong
Attorney, Agent, or Firm—Cushman, Darby & Cushman

[57] ABSTRACT

An improved invertor control system for controlling overcurrent. The system includes a means for detecting the voltage and current levels in the invertor. In response the level of current is controlled to maintain a uniform output.

3 Claims, 8 Drawing Figures

INVERTER SYSTEM

BACKGROUND OF THE INVENTION

This invention relates to an inverter system which is suitable as a power supply system for electronic data processing systems and for electronic systems in general, and more particularly, to an improvement for a control device which limits overcurrent in power semiconductor switches.

FIG. 1 shows the power circuit in a prior art inverter. In the Figure, the letter E denotes a DC power source, and X, Y are DC source terminals. $S_1$ to $S_4$ denote power semiconductor switches which may be, for instance, transistors, or GTO thyristors. The portion I encircled by a broken line is a DC to AC converter. The letter F denotes a filter which extracts a sine wave which is the fundamental frequency component of the distorted AC voltage in the output of the DC to AC converter I. The letter L denotes a load of the inverter formed by the DC to AC converter and the filter F. T is a transformer and CT is a current transformer for current sensing.

A current suppressing control for limiting overcurrent in such a device is constructed to control current at a constant value by interrupting a feedback voltage control system in such a manner that the output current sensed by the current transformer CT will not exceed a preset value.

FIG. 2 is a block diagram of a prior art inverter feedback control system wherein the reference numeral 1 denotes a reference DC voltage generator which generates a DC voltage as a reference against which the output voltage is compared. A rectifier and smoothing filter 2 converts the output voltage v of the inverter system into a DC voltage. An error amplifier 3 amplifies the difference between the output of the reference DC voltage circuit 1 and the output of the rectifier and smoothing filter 2. A reference DC voltage generator 1' generates a DC voltage which is the reference for the output current limiting system. A peak voltage holding circuit 2' is internally provided with a time constant circuit which converts the output current i to direct current, as well as, make the output voltage rise slowly after the over-current has disappeared. An error amplifier 3' amplifies the difference between the output of the reference voltage generator 1' and the output of the peak voltage holding circuit 2'. The reference numeral 4 denotes a sine wave generator. An amplitude modulator 5 modulates the output amplitude of the generator 4 by using either the level of the output from the error amplifier 3 or that of the output from the error amplifier 3', whichever is lower. A triangle voltage generator 6 and a PWM (pulse width modulation) circuit 7 generates a pulse width modulation signal by using the output from the triangle voltage generator 6 as a carrier and by receiving the output from the modulator 5 as a modulation input. The reference numeral 8 denotes a logic circuit which converts the output from the PWM circuit 7 into an on-off driving signal for switches which turn on/off the output of the PWM circuit 7.

In the prior art system mentioned above, when an overcurrent occurs temporarily in the output current and after the overcurrent is disappeared, the output voltage must be increased at a sufficiently slow rate so as not to saturate the transformer T. More particularly, even if the overcurrent flows only for a short time (e.g. a half cycle) and the load is restored immediately to a normal condition, the resulting abnormally low voltage will last over several cycles and the output voltage from the inverter will not immediately return to the normal voltage level. Meanwhile, power is not fed to the load causing disruption to the load especially when a data processing system is connected as a load.

Accordingly, this invention obviates the aforementioned prior art defects and provides an inverter device which is capable of restoring the output voltage to a normal value immediately after the overcurrent disappears even if such an overcurrent occurs temporarily and does not influence other loads even in the case where an overcurrent of short duration, such as a rush current for a transformer or filter capacitors, flow in the load.

SHORT STATEMENT OF THE INVENTION

The present invention relates to a structure comprising a current sensor which detects the current of the primary winding of a transformer. A comparator detects whether or not the detected output from the current sensor exceeds a preset value. A means is provided for inhibiting the output of on/off driving signals to said switch so as to open the same only during the period the output is being sent from the comparator. This is done to restore the output voltage to a normal value immediately after the overcurrent is recovered.

The second embodiment of the invention is, also, characterized in that the output of the on/off control signals is inhibited only during the period from the time the output is transmitted from the comparator until the time the output reaches a predetermined phase of the output carrier from said carrier wave generator means to open the switch so as to quickly restore the output voltage to the normal value after recovery.

According to this invention, the output voltage can be limited only when overcurrent is actually flowing. After the overcurrent is corrected, the voltage can be quickly restored to the normal level within half a cycle. Even if the transformer is saturated due to the field distortion caused by the voltage recovery, the voltage is limited only when the saturation current is flowing so that it is restored to the normal condition within a short time. The influence on the loads is minimized, thereby enabling protection of the semiconductor switches. Therefore, even if a load is connected which might cause a rush current, because the voltage dips only during the period when the rush current is connected, it would not greatly affect other loads connected in parallel thereto.

The system according to this invention is economical because the switch can be utilized to its full ability because a resistance is used in the current sensor to correctly detect the output current even if a DC component is included in the output, when the transformer is saturated.

DETAILED DESCRIPTION OF THE PREFERRED EMBODIMENTS

Figure 3:
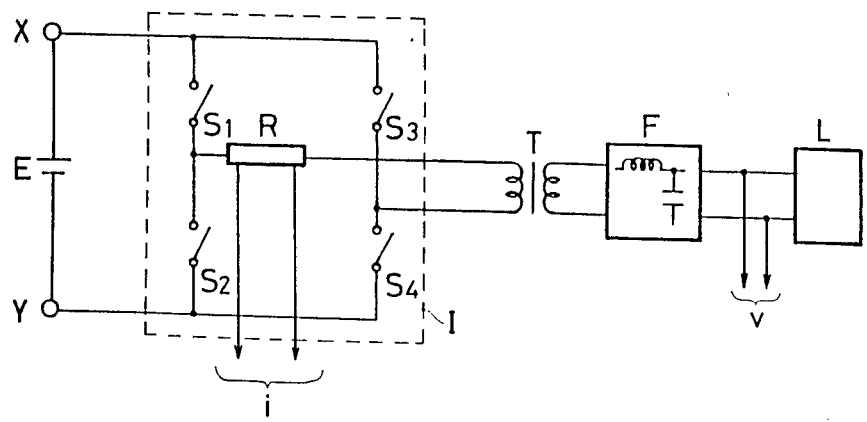
FIG. 3 is a schematic diagram of the power circuit of preferred embodiment of the present invention.

FIG. 3 is a block diagram of the power circuit of a preferred embodiment according to the present invention. This embodiment is characterized in that the output current which is supplied to the primary winding of the transformer T is conducted through a current sensor R. The current sensor R comprises a resistor or a current transformer (CT).

Figure 4:
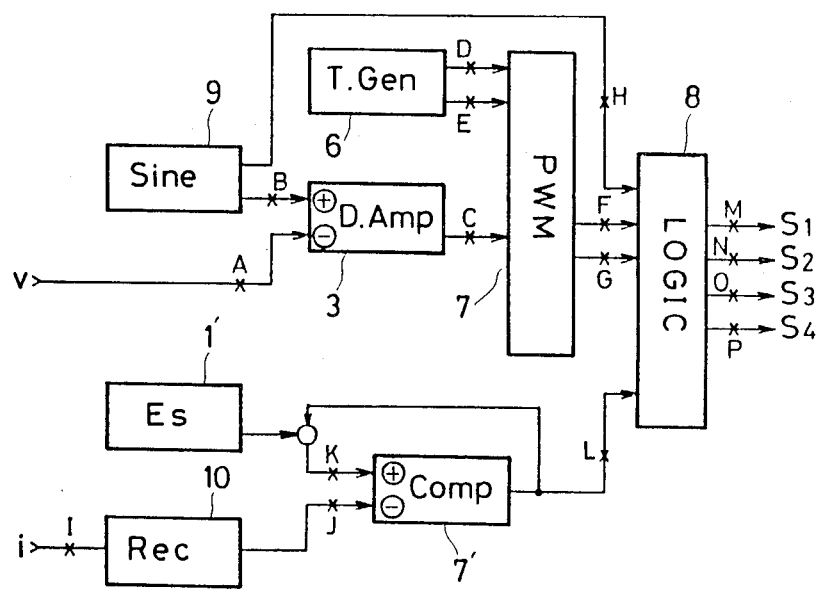
FIG. 4 is a block diagram of the control circuit of the preferred embodiment of the present invention.

FIG. 4 is the of circuit structure of the first embodiment of the control section which feeds control signals to turn on and off switches $S_1$ through $S_4$ of the above-mentioned circuit. The reference numeral 9 denotes a sine wave generator which generates the reference voltage. The output voltage v from the power circuit of FIG. 3 is an input to an error amplifier 3. The other input is the output from the sine wave generator 9. The output from the error amplifier 3 is the modulation input of the PWM circuit 7. The PWM circuit 7 is provided with a carrier signal from the triangle voltage generator 6. The output from the PWM circuit 7 is fed to the logic circuit 8 as the voltage control signal pulse.

The current signal i detected by the current sensor R, shown in FIG. 3, is transformed to a DC signal by a full-wave rectifier 10. The output from the full-wave rectifier 10 and the output from the reference DC voltage generator 1' are respectively fed to the two inputs of the comparator 7' for comparison. From the output of this comparator 7' is obtained a current control signal pulse. The output from the comparator 7' is positively fed back to the positive input terminal thereof and is added to the output of the reference DC voltage generator 1'. Due to the positive feedback, the comparator 7' gains a hysteresis transfer function.

Figure 5:
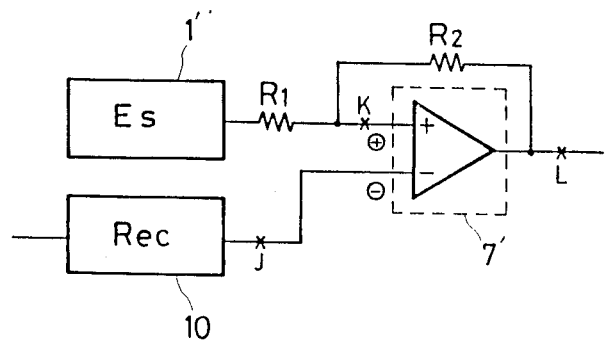
FIG. 5 is a schematic illustration of a portion of the circuit of the preferred embodiment of the present invention.

FIG. 5 shows in greater detail the circuit structure of the portion of the circuit in FIG. 4 encircled by dot chain lines. The comparator 7' comprises a differential operational amplifier and is given a positive feedback by a resistor $R_2$. In the logical circuit 8, when the output from the comparator 7' drops to a low level, all the control outputs are inhibited so as to open all of the switches $S_1$ through $S_4$ at once.

Figure 6:
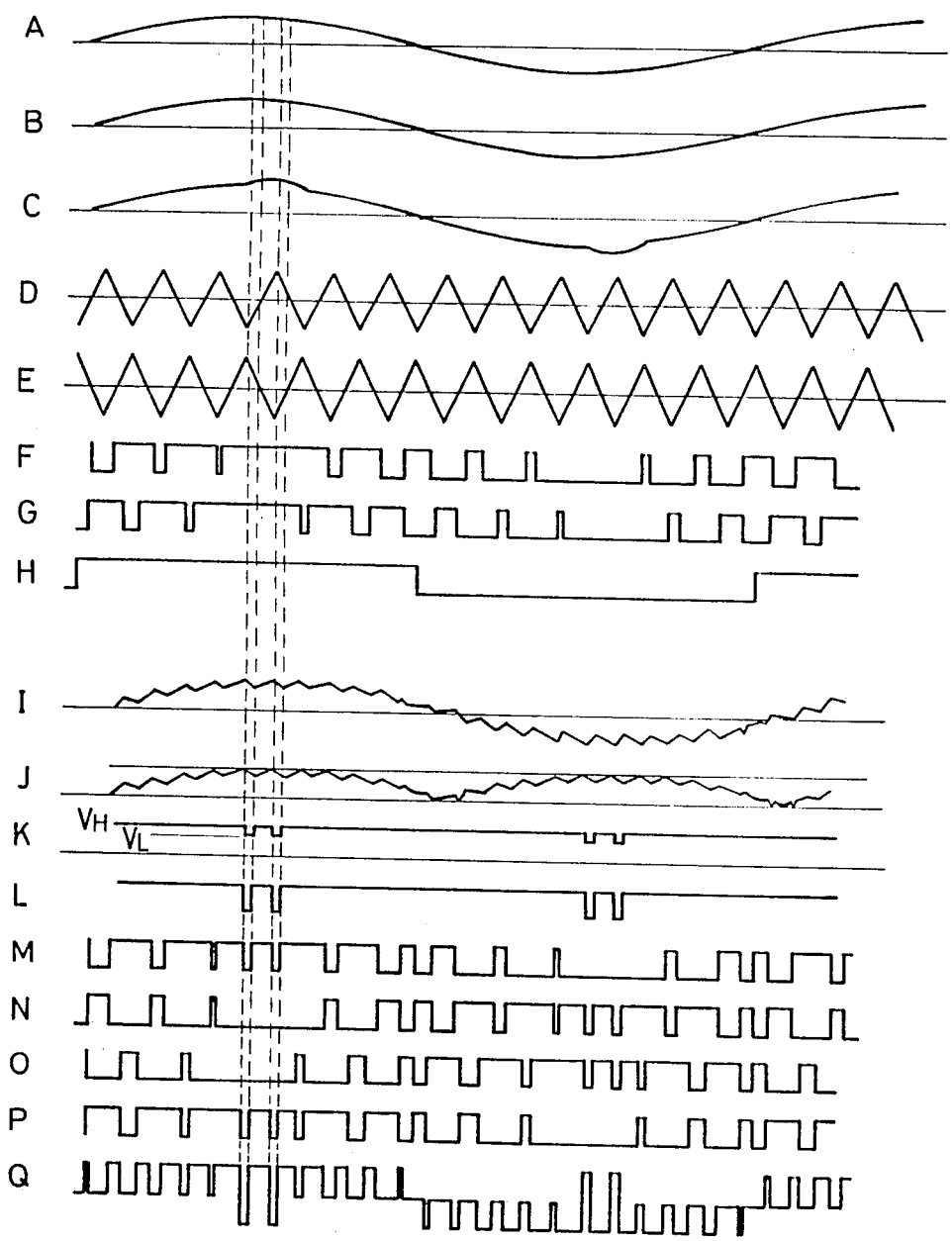
FIG. 6 shows waveforms of respective portions of the preferred embodiment of the present invention.

The operation of the system having the above-mentioned structure will now be described. FIG. 6 shows waveforms for explaining the operation of the circuit. Waveforms A through P illustrate the signals at the points A through P in FIG. 4 or 5. Waveform Q illustrates the output waveform from the conversion circuit shown in FIG. 3.

The output voltage v supplied to the load in FIG. 3 assumes the waveform of a sine wave A shown in FIG. 6. On the other hand, the sine wave generator 9 operates signals having the waveform B of FIG. 6. The difference between the waveform A and B is amplified by the error amplifier 3 to assume the waveform C of FIG. 6. The triangle voltage generator 6 generates triangle waves and the antiphase thereof which are the waveforms D and E shown in FIG. 6. The PWM circuit compares the level of signals C, D, and E, thereby obtaining the waveform which is the voltage control pulse train. This pulse train assumes a high level when the waveform C assumes a level higher than the waveform D and assumes a low level when waveform C assumes a level lower then the waveform D.

The output current i of the current sensor R is rectified by the full-wave rectifier 10 to assume the waveform J of FIG. 6. The output from the reference DC voltage generator 1' is added to the output of the comparator 7' to assume the waveform K of FIG. 6. The waveform K goes to the level $V_H$ when the output L of the comparator 7' is high and goes to the level $V_L$ when the output L thereof is low. Thus, the waveform K has two levels. The comparator 7' compares the levels of the waveforms J and K to derive the waveform L of FIG. 6 which is the current control pulse train. When the output from the feedback voltage control system is inhibited by the output L of the comparator 7', the switches $S_1$ through $S_4$ are turned off to thereby suppress the increase in overcurrent.

In other words, while the output J of the full-wave rectifier 10 which corresponds to the absolute value of the output current, is at a low level, the output L of the comparator 7' is at a high level, and the input H of the comparator 7' is at the level of $V_H$. As the current increases and the output J of the full-wave rectifier 10' exceeds $V_H$, the output L of the comparator L drops to a low level. During that time, all of the output signals are inhibited by the logic circuit 8 to turn off the switches $S_1$ through $S_4$, which gradually reduces the current i. On the other hand, the input K of the comparator 7' changes to the level $V_L$ due to the positive feedback when the output L of the comparator 7' is at a low level. As the current i decreases and the output J of the full-wave rectifier 10 decreases below the level $V_L$, the inhibition is released to restore the switches $S_1$ through $S_4$ to a condition which is controllable by the signals from the voltage control system. Because it takes time for the decreasing current to lower the output J of the full-wave rectifier 10, the switches $S_1$ through $S_4$ do not switch at a high frequency. The on-off signals M through P of the switches $S_1$ through $S_4$ can be expressed by a logical formula as below.

$$M = L \cdot (F \cdot H + G \cdot \overline{H})$$

$$N = L \cdot \overline{(F \cdot H + G \cdot \overline{H})}$$

$$O = L \cdot \overline{(G \cdot H + F \cdot \overline{H})}$$

$$N = L \cdot (G \cdot H + F \cdot \overline{H})$$

The reference numeral H denotes a rectangular wave corresponding to one cycle of the output of the sine wave generator 9.

As stated above, when an overcurrent occurs temporarily in the load, it is immediately fedback to the control system so as to be controlled to reduce the output voltage, thereby cancelling the overcurrent and at the same time recovering the normal voltage.

Figure 7:
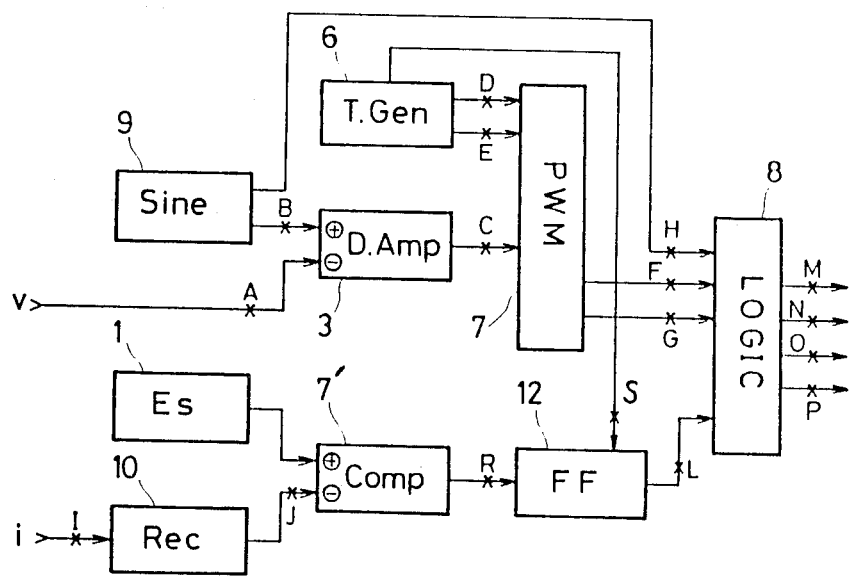
FIG. 7 shows a block diagram of the control circuit of another preferred embodiment of the present invention.

FIG. 7 shows the second embodiment according to this invention. FIG. 7 shows only the control circuit which controls the circuit shown in FIG. 3. When the control circuit is compared with the control circuit shown in FIG. 4, this circuit is characterized in that the R (reset) terminal of the RS flip-flop 12 is connected to the output of the comparator 7'. The output of the triangle voltage generator 6 is connected to the S (set) terminal thereof, and the output from the flip-flop 12 is fed to the logic circuit 8. There is no positive feedback provided to the comparator 7'. Other components are similar to the first embodiment mentioned above.

Figure 8:
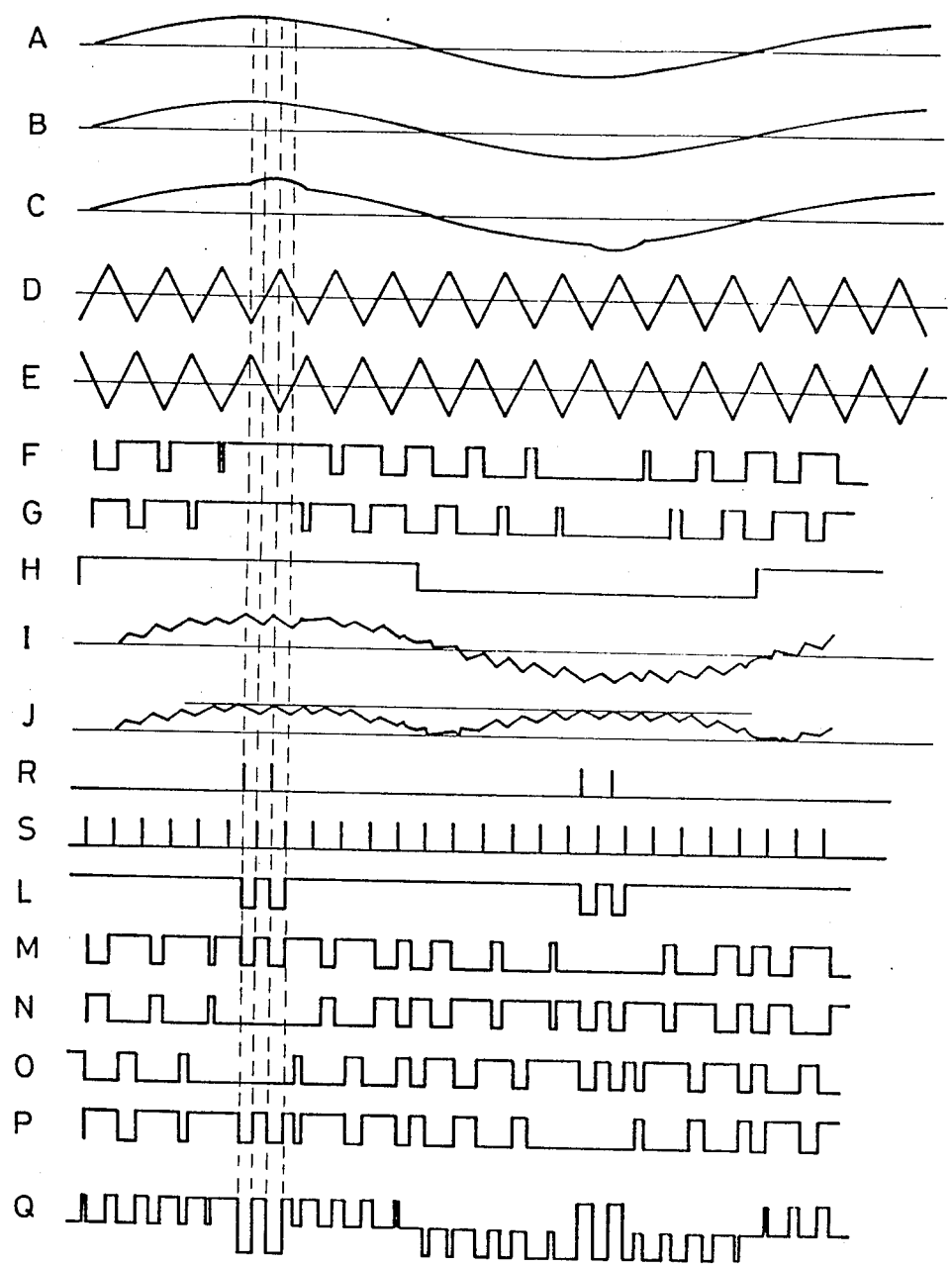
FIG. 8 shows waveforms of the second preferred embodiment of the present invention.

Referring to the waveform chart shown in FIG. 8, the operation of the system constructed as above is described. The waveforms A through S shown in FIG. 8 are the voltage waveforms at the points A through P of FIG. 7.

As the current i increases and the output J of the full-wave rectifier 10 reaches a level equivalent to the output of the reference DC voltage circuit 1 which establishes the current limiting value, the output R of the comparator 7' goes high. By this signal, the output L of the flip-flop 12 drops to a low level, inhibiting the output form the logic circuit 8. During this time, the switches are turned off. The output L of the flip-flop 12 is held at the low level until it is reset by the pulse train of the waveform S which goes high level every half cycle of either the output D or E of the triangle generator 6. The above-mentioned off-condition will be maintained until the end of the half cycle of the carrier. The flip-flop 12 is again set by the waveform S and, when the output Q thereof goes high, the inhibition is released to restore the switches $S_1$ through $S_4$ to the normal driving condition with the signal of the voltage control system. As the inhibited condition continues until the end of the half cycle of the carrier, the switches $S_1$ through $S_4$ will not be switched with a frequency higher than twice the carrier frequency.

Figure 1:
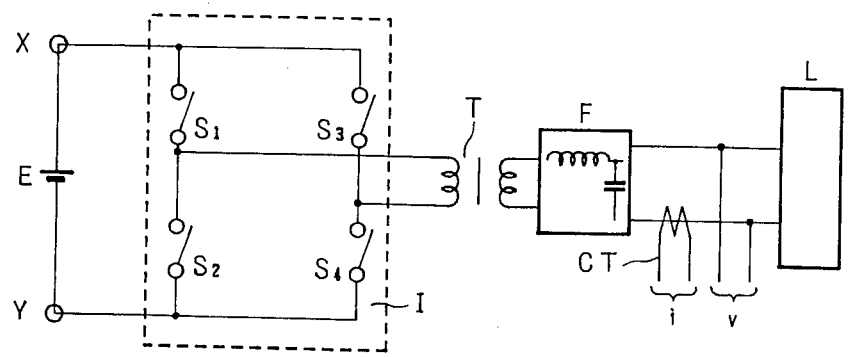
FIG. 1 is a block diagram of the power circuit of a conventional inverter system.
Figure 2:
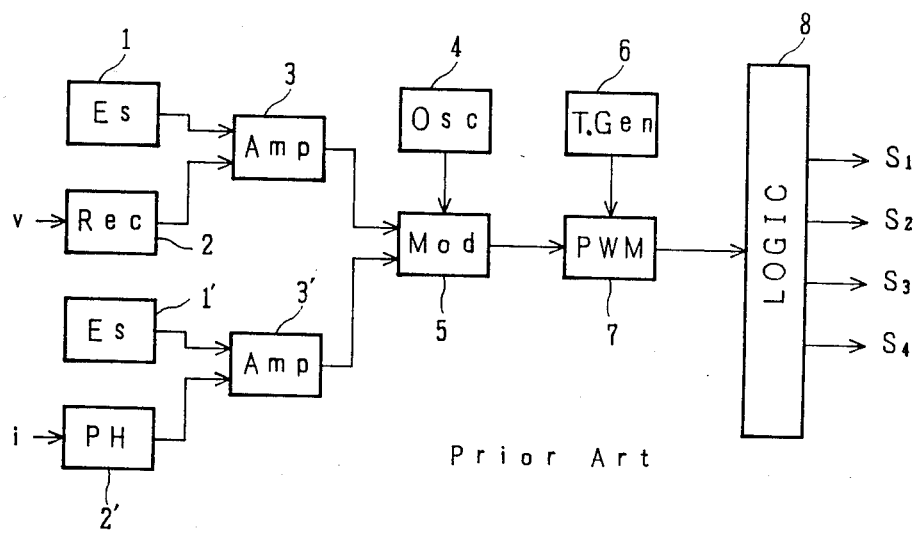
FIG. 2 is a block diagram of the control circuit of a conventional inverter system.

The above description is of an embodiment where a sine wave is used as the reference and the output voltage is compared with the reference. However, this invention can be applied to the case, wherein the voltage control system shown in FIG. 2, a DC voltage is used as the reference and the output voltage is compared with the reference voltage only after it has been rectified and smoothed. Although the above description relates to the case where this invention is applied to an inverter system having a single phase output, it may be combining in a three-phase inverter by using three units of the above-mentioned single phase output inverter therefore. The conversion circuit of the inverter is not limited to the single-phase bridge circuit shown in FIG. 3, but rather the present invention may be applied to a conventional half bridge circuit or a three-phase bridge inverter circuit.

It should be appreciated that there may be other embodiments of the present invention which fall within the spirit and scope thereof as defined by the appended claims:

What is claimed is:

1. An inverter system comprising:
    a DC power source input terminal, a converter circuit including plural semiconductor switches which convert the DC power source input to AC power by alternately switching the switches,
    a transformer for transforming the output from said converter circuit,
    a filter for extracting the fundamental frequency from the output of the transformer as the AC output of the system,
    a fundamental freuqency generator means for generating a signal having said fundamnetal frequency,
    a carrier wave generator for generating a signal having the on-off frequency of said switches,
    an error amplifier for receiving as differential inputs, the output of said fundamental frequency generator means and said AC output, and
    a pulse width modulation circuit for receiving as a modulation input, the output of said error amplifier and as a carrier wave input, the output from said carrier wave generator, said modulation circuit suppling a plurality of on-off pulse width modulated control signals to said pural switches of said converter circuit for each half cycle of said fundamental frequency signal,
    a current sensor for detecting the current of the primary winding of said transformer,
    a comparator means for detecting whether the output from said current sensor exceeds a given value, and
    a means for inhibiting the output of said on-off control signals coupled to said switches during the period the sensed current exceeds a given valve.

2. An inverter system comprising:
    a DC power source for generating DC power,
    a converter circuit including plural semiconductor switches for converting said DC power to AC power by alternately switching said switches,
    a transformer for transforming the voltage of the output from said converter circuit,
    a filter for extracting the fundamental frequency component of said transformed voltage, said fundamental frequency being the output of the system,
    a fundamental frequency generator means for generating a signal having said fundamental frequency,
    a carrier wave generator means for generating a signal having the on-off frequency of said switches,
    an error amplifier for receiving as a positive input, the output from said fundamental frequency generator means and as a negative input, said AC output,
    a pulse width modulation circuit receiving said output from said error amplifier and said output from said carrier wave generator means for feeding a plurality of pulse width modulated on-off control signals to said plural switches of said converter circuit for each half cycle of said fundamental frequency signal,
    a current sensor for detecting the current of the primary winding of said transformer,
    a comprator means for detecting whether or not the output from said current sensor exceeds a given value,
    a hysteresis means for generating a hysteresis transfer function by positively feeding back the output of the comparator means to the input thereof, and
    a means responsive to said hysteresis means for inhibiting the on-off control signals coupled to said switches only during the period the sensed current exceeds a given valve.

3. An inverter system comprising:
    a DC power source for generating DC power,
    a converter circuit including plural semiconductor switches for converting said DC power to AC power by alternately switching said switches,
    a transformer for transforming the voltage of the output of the converter circuit,
    a filter for extracting the fundamental frequency component of said transformed voltage, said fundamental frequency being the output of the system,
    a fundamental frequency generator means for generating a signal having said fundamental frequency,
    a carrier wave generator means for generating a signal having the on-off frequency to said switches, an error amplifier for receiving as a positive input, the output from said fundamental frequency generator means and as a negative input, said AC output, a pulse width modulation circuit receiving said output from said error amplifier and said output from said carrier wave generator means for generating a plurality of pulse width on-off modulated control signals to said plural switches of said converter circuit for each half cycle of said fundamental frequency signal, a current sensor for detecting the current of the primary winding of said transformer, a comparator means for detecting whether or not the output from said current sensor exceeds a given value and for generator an output when said current exceeds said value, and a means for inhibiting the on-off control signals coupled to said switches only during the period from the time an output is generated by the comparator means until the time it reaches a predetermined phase of the output carrier wave of said carrier wave generator means so as to open said switches.

* * * * *